Aug. 27, 1957     R. E. HOPKINS     2,803,997
IMAGE-FORMING OPTICAL LENS TELEPHOTO SYSTEMS
Filed May 18, 1954     2 Sheets-Sheet 1
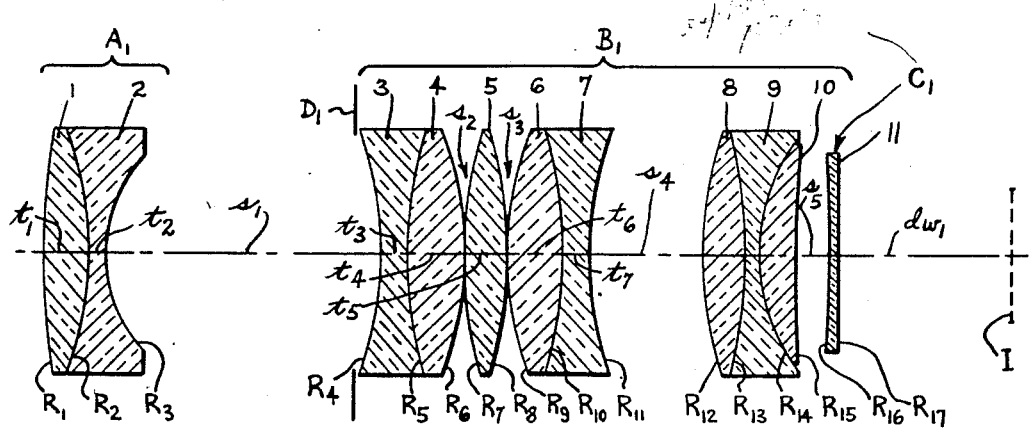
Fig. 1
| EFL = 100 mm | | | | $f = /1.8$ |
|---|---|---|---|---|
| LENS | $N_D$ | V | RADII | THICKNESSES |
| 1 | 1.689 | 30.9 | $R_1$ = 406.00 mm | $t_1$ 24.00 mm |
| 2 | 1.611 | 58.8 | $R_2$ = -190.13 | $t_2$ = 9.00 |
| | | | $R_3$ = 74.53 | $s_1$ = 145.47 |
| 3 | 1.617 | 36.6 | $R_4$ = -185.00 | $t_3$ = 13.00 |
| 4 | 1.611 | 58.8 | $R_5$ = 251.10 | $t_4$ = 28.00 |
| | | | $R_6$ = -168.60 | $s_2$ = 0.10 |
| 5 | 1.611 | 58.8 | $R_7$ = 255.73 | $t_5$ = 22.00 |
| | | | $R_8$ = -333.47 | $s_3$ = 0.10 |
| 6 | 1.611 | 58.8 | $R_9$ = 168.60 | $t_6$ = 28.00 |
| 7 | 1.617 | 36.6 | $R_{10}$ = -251.10 | $t_7$ = 13.00 |
| | | | $R_{11}$ = 185.00 | $s_4$ = 60.00 |
| 8 | 1.611 | 58.8 | $R_{12}$ = 200.40 | $t_8$ = 21.33 |
| 9 | 1.5795 | 41.0 | $R_{13}$ = -333.47 | $t_9$ = 9.00 |
| 10 | 1.611 | 58.8 | $R_{14}$ = 104.93 | $t_{10}$ = 18.67 |
| | | | $R_{15}$ = 582.80 | $s_5$ = 16.80 |
| 11 | 1.523 | 58.5 | $R_{16}$ = ASPHERIC | $t_{11}$ = 4.80 |
| | | | $R_{17}$ = ∞ | |
Fig. 2
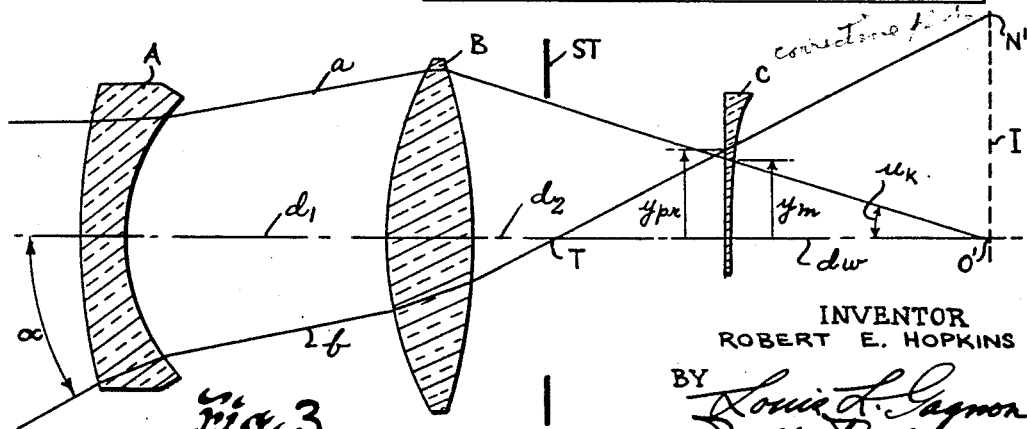
Fig. 3
INVENTOR
ROBERT E. HOPKINS
BY Louis L. Gagnon
    Noble J. Williams
ATTORNEYS

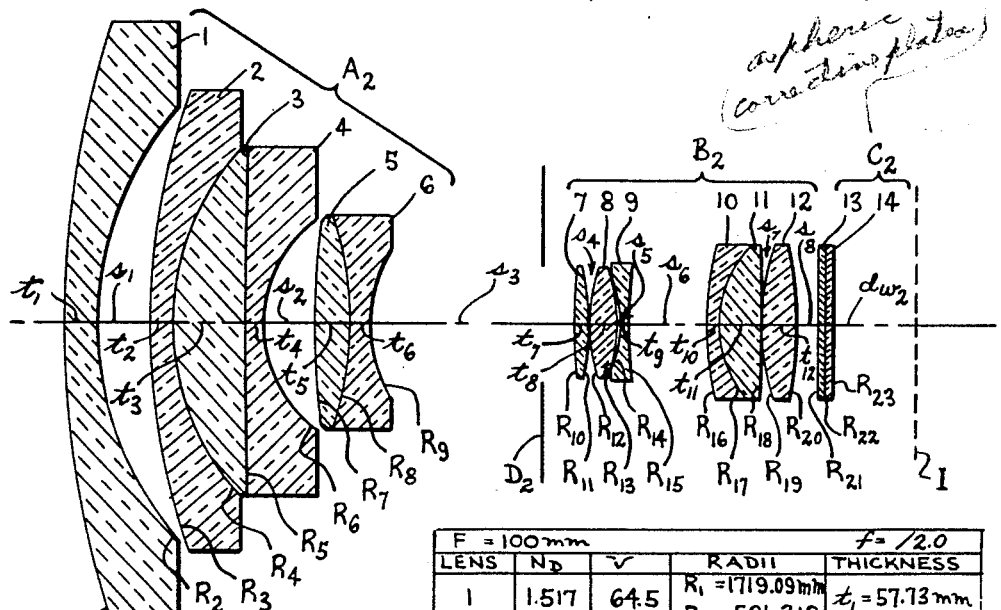

United States Patent Office 2,803,997
Patented Aug. 27, 1957

2,803,997
IMAGE-FORMING OPTICAL LENS TELEPHOTO SYSTEMS

Robert E. Hopkins, Rochester, N. Y., assignor to American Optical Company, Southbridge, Mass., a voluntary association of Massachusetts Application May 18, 1954, Serial No. 430,582

18 Claims. (Cl. 88—57)

This invention relates to high quality, high speed image forming optical systems for use as photographic objectives, projection objectives and the like. More particularly, the invention relates to such image forming optical systems having a relatively wide angle or even very wide angle on the long conjugate side thereof while providing a sufficiently long working distance on the short conjugate side thereof to accommodate mechanical components of an associated motion picture camera or projector and while also providing a careful control of distortion and high correction for astigmatism, spherical and chromatic aberrations, coma and curvature of field.

In a broad sense in lens systems embodying the present invention, a first divergent part (or component) and a second convergent part (or component) are arranged in axially spaced relation to each other so as to provide an inverse telephoto type objective. When such a system is intended to function as a camera objective, for example, the convergent part collects and refracts light rays coming from an object on the long conjugate side of the system and focuses same at an image plane on the short conjugate side thereof. By providing a divergent part forwardly of and in proper spaced relation to this convergent part, it is possible to take advantage of the fine high speed image forming qualities of a convergent part which might otherwise be inadequate because of insufficient object field on the long conjugate side of the system and because of excessive curvature of field. Another and important advantage to be obtained from the use of this type of wide angle system is the fact that illumination losses resulting from the cosine fourth law are almost negligible. This is because the principal ray reaches the focal plane of the system at almost normal instance.

Such an arrangement of divergent and convergent components for forming a lens system is not new. However, normally images formed by such a system would be far from acceptable for most photographic uses for they would have objectionable amounts of one or more aberrations such as curvature of field, distortion and astigmatism, especially if a field of any appreciable angular value were being comprehended. It has been found, however, that while the convergent component of such a reverse telephoto type of system may introduce a considerable amount of inward curvature of field as well as negative astigmatism, if the divergent component is provided with a sufficiently short focal length (that is to say, if the component is of strong negative power), this curvature of field can be reduced or even completely eliminated if desired. (The curvature might even be made of reverse sign if such were not for other reasons undesirable.) However, under such conditions of field curvature compensation by the divergent component of comparatively short focal length, considerable negative distortion will be introduced into the system, and the amount being introduced increases rapidly as the focal length is made shorter.

It has been found, however, that the negative astigmatism introduced by the convergent part may be removed or greatly reduced and the negative distortion introduced by the divergent part reduced and controlled, or even substantially eliminated if the operating conditions require, if an aspheric component of proper optical design is provided and is suitably positioned in the optical system between the convergent component and the back focal plane of the system on the short conjugate side thereof, in the manner to be hereinafter described.

It is, accordingly, an object of the present invention to provide an optical system of the character described which will have a relatively wide field angle on the long conjugate side thereof, a materially reduced curvature of field, and which will provide an image either substantially free from distortion or of carefully controlled distortional characteristics, while providing said high image quality at relatively high numerical apertures.

It is an additional object of the present invention to provide an optical system of the character described which will provide images of high quality at relatively wide angular field while having predetermined carefully controlled amounts of negative distortion present therein.

It is another object of the present invention to provide a lens system of the character described having a relatively high numerical aperture and providing a relatively wide angular field on the long conjugate side thereof and with or without negative distortion while being well corrected for spherical and chromatic aberrations, coma, curvature of field and astigmatism.

Another object is to provide lens systems of the above character and possessing the advantages described so as to achieve said previously mentioned objects while also obtaining as compact a system as is practical both as to length of system and physical diameters of lenses thereof.

Another object is to provide objectives having their components carefully optically designed and correlated with a view to accomplishing the above desired features and embodying an aspherically controlled element or elements for providing high correction for astigmatism and control of distortion while allowing the remaining components of the system to be reduced to a minimum size and weight.

Other objects and advantages of the invention will become apparent from the detailed description which follows when taken in conjunction with the accompanying drawing in which:

Fig. 1 is a sectional view of an optical system embodying the present invention;

Fig. 2 is a table of optical values for the optical system of Fig. 1;

Fig. 3 is a diagrammatic sketch for use in obtaining a better understanding of the invention;

Fig. 4 is a sectional view showing another form of an optical system embodying the present invention; and Fig. 5 is a table of optical values of the optical system of Fig. 4.

Referring to Fig. 1, it will be seen that the optical system thereof comprises first on the long conjugate side thereof a divergent part represented by the reference character $A_1$ and a convergent part $B_1$ in axially aligned rearwardly spaced relation therewith. In Fig. 4, on the other hand, a different optical system is shown but it should be appreciated that this system likewise comprises a divergent part $A_2$ as the first component on the long conjugate side of the system and a convergent part $B_2$ in optically aligned spaced relation therewith. While each of these parts in both systems will generally comprise a plurality of refractive elements, they are diagrammatically indicated in Fig. 3 merely as single components A and B so that the basic principles of the present invention may be more readily explained.

In such a system the divergent component receives the light rays coming from a relatively wide object field and forms a virtual image forwardly thereof. The convergent component of the optical system receives these rays passing through the divergent component and brings same to a real image at the back focal plane of the combined system. The divergent component A in Fig. 3 thus is of such optical characteristics as to receive light rays, such as $a$ and $b$, coming from spaced object points on the long conjugate side of said system and focus same at the back focal plane or image plane I of the system. The ray $a$ may be taken as a marginal ray coming from an axial object point and being refracted by the components A and B so as to cross the optical axis of the system at the axial image point O'. The ray $b$ on the other hand, may be taken to represent a principal ray coming from an object point a the outer edge of the object field of the system and being directed toward the image point N' at the back focal plane I of the system.

In an optical system as shown in Fig. 3 having divergent and convergent components A and B arranged in axially aligned spaced relation to each other, advantage might be taken of the fine image forming properties of the convergent component thereof provided the considerable and objectionable inward curvature of field thereof can be reduced. It has been found, however, that the optical properties of the system may be so altered as to materially reduce this curvature of field, if the divergent component thereof is arranged to have a relatively short focal length $F_A$ with reference to the equivalent focal length F of the system. In fact, it is interesting to note that this focal length $F_A$ may even be made, if desired, so short that the curvature of field of the system can be substantially completely eliminated. Such a condition has not been considered heretofore to be advisable, however, for if the focal length $F_A$ is made short enough to produce such a minimizing of field curvature, the amount of negative distortion which would be introduced into the system thereby would ordinarily be quite objectionable.

It will now be shown that by the provision of a corrective part or component, such as the component C in Fig. 3, if properly disposed in the system and if of proper shape, not only may the negative distortion of the system be reduced or substantially eliminated, as desired, but also a compensating positive astigmatism may be introduced thereby which may be used to reduce the negative astigmatism generally contributed by the convergent part B. While the divergent front component can be employed, when its focal length is carefully chosen and made relatively short, to minimize or even substantially eliminate such inward curvature of field, the negative component A of short focal length will introduce negative distortion and this becomes greater as the focal length thereof becomes shorter. As stated above, another important consideration in such a system is that the positive component thereof (whether it be a single element as shown at B in Fig. 3, or a more complex unit such as a modified Petzval portrait objective) may possess negative astigmatism and this, of course, must be properly cared for.

The negative component A located in front of the component B adds positive curvature of field which tends to compensate for the negative curvature of component B. The field curvature P (or Petzval curvature) of a system of thin lenses may be obtained by use of the general equation:

$$P = -\Sigma \frac{1}{f \times n} \qquad (1)$$

Or when the equation written for the system of Fig. 3 considered as thin lenses, it would be:

$$P = -\frac{1}{f_A \times n_A} - \frac{1}{f_B \times n_B} \qquad (2)$$

and wherein $f_A$ and $f_B$ are the focal lengths for the component A and B, respectively, and $n_A$ and $n_B$ are the refractive indices thereof.

Equation 2 indicates that if $f_A$ is made small the divergent component A will contribute a large amount of positive curvature and this will tend to compensate for the negative curvature contributed by the convergent component B. It is thus possible by this arrangement to make the field curvature of the optical system almost any positive or negative value desired, even to having it substantially equal to zero.

It has, at the same time, been found that the spacing $d_1$, between the divergent component A and convergent component B should be as large as practical in order to reduce as much as possible image errors at the image plane I. The reason for this is that as the distance $d_1$ is increased, for given conditions of focal lengths and field curvature, the surface curvatures of the adjacent components may be reduced. However, from the practical standpoint the distance $d_1$ should not be made too large for then the positive components B would have to have a very large diameter; for otherwise it would fail to intercept and pass the marginal axial ray $a$. Also, if the positive component B has to cover a large field on the long conjugate side, represented by the half field angle $\alpha$, the divergent component A also would become very large in order to intercept and allow the principal ray $b$ from the edge of the field to pass therethrough.

As previously stated, the convergent component B contributes negative field curvature and negative astigmatism to the system. The divergent component A could be arranged to correct for both of these aberrations if large amounts of barrel distortion were not introduced thereby. However, as the focal length of component A is made shorter the distortion increases and soon became excessive (even though some uses of such an optical system might tolerate some image distortion, as will appear hereinafter). In order to reduce this excessive negative distortion the negative component A might be bent concavely about the component B if it were not for the fact that by so doing some of the positive astigmatism contributed thereby for reducing the strong negative astigmatism of component B would unfortunately be lost.

An aspheric correction part or component, however, it has been found, may be added to the optical system and if of proper shape (or deformation) and properly located in the system between the rear surface of the component B and the back focal plane of the system large amounts of the distortion and astigmatism of the system be removed. At the same time the positive component B may be bent to proper shape to correct for the spherical aberration and coma of the system including the aspheric part or component C since the shape of component B will have no material influence on the astigmatic or distortion aberrations of the system.

If the aspheric correction component C having rotational symmetry about the optical axis were located at the aperture stop ST of the system, the principal ray $b$ from the edge of the object field will cross the optical axis at the center T of the stop and only the central portion of the correction component C will have any effect thereon. At the same time the marginal axial ray $a$ would pass through an outer portion of the component C and the outer portion only will influence this ray. The transverse spherical aberration contribution TA at such time may be expressed by the equation:

$$TA \sim \left[\frac{4(n-1)c}{u_a}\right] y_m{}^4 \qquad (3)$$

wherein $n$ is the refractive index of the correction component, $u_a$ is the angular value of the marginal axial ray $a$ at the image plane, $c$ is a constant determined by the preceding components of the optical system, and the symbol $\sim$ means that the value of the term to the left thereof varies as the value of the term to the right thereof. Or expressed differently with $$\frac{4(n-1)c}{u_a} = K$$

the transverse spherical aberration contribution will be:

$$TA \sim K y_m^4 \quad (4)$$

If the correction component C is moved rearwardly from the aperture stop of the system the coma $C_s$ of the system may be expressed as follows:

$$C_s \sim R(TA) \quad (5)$$

wherein TA is the spherical aberration contribution and R is the ratio of the heights of the rays $b$ and $a$, respectively, at the correction component C. This ratio may be written as follows:

$$R = \frac{y_{pr}}{y_m} \quad (6)$$

The coma contribution $C_s$ provided by the correction component C can also be expressed as follows:

$$C_s \sim (y_{pr} y_m^3) K \quad (7)$$

Thus coma will increase most rapidly in value as the height of $y_m$ is increased by displacing the component C away from the image plane I.

The astigmatic contribution $A_s$ provided by the correction component C likewise can be expressed as follows:

$$A_s \sim R^2(TA) \quad (8)$$

or combining Equations 4 and 6 as:

$$A_s \sim (y_{pr}^2 y_m^2) K \quad (9)$$

The distortion contribution $D_s$ may be expressed as follows:

$$D_s \sim R^3(TA) \quad (10)$$

or by again using Equations 4 and 6 as:

$$D_s \sim (y_{pr}^3 y_m) K \quad (11)$$

Thus it will be seen that the aspheric correction component can be made to play an important part in the system when properly shaped and properly located along the optical axis thereof. This component C can be made in the form of a thin plate having one surface thereof plano and the other surface curved and in such a way that the thickness thereof at different distances from the optical axis, the $y$ axis for the curve, to the outer edge of the plate will vary with the displacement $y$ in accordance with the following general mathematical equation:

$$x = ay^2 + cy^4 + ey^6 + \text{higher even terms} \quad (12)$$

and wherein $y$ is always positive, and $a$, $c$ and $e$ are constants for the particular optical system using the aspheric component. For the particular optical systems described, all the coefficients with the exception of $c$ and $e$ have been set equal to zero so the equation may be expressed as follows:

$$x = cy^4 + ey^6 \quad (13)$$

Thus by altering the position of the aspheric component along the optical axis, that is to say by increasing (or decreasing) the distance $d_2$ between this component and the convergent component at the expense of the distance $d_w$ between the correction component and the image plane I, it is possible to change the value of $(y_{pr}^2 y_m^2)$ for astigmatism and $(y_{pr}^3 y_m)$ for distortion while the constant $c$ remains unchanged. In this manner the best balance between minimum astigmatism for the system and the percent image distortion desired for the system may be obtained.

Therefore, by positioning the plate and forming the surface of the plate to the proper shape or curvature, distortion of substantially any amount can be introduced. If the thickness of the plate increases from the center to the edge, the plate will introduce positive distortion and astigmatism when located between component B and the back focal plane I and thus can be made to compensate to a high degree for the negative distortion and negative astigmatism of the rest of the optical system.

In Fig. 1 it will be seen that an axially aligned correction part or component $C_1$ is shown between the rear surface of convergent part $B_1$ and the back focal plane I; and in Fig. 4 a correction part or component $C_2$ is similarly disposed. Following these principals of optical design high speed, wide angle, inverse telephoto type systems of widely varying characteristics may be obtained, and in order to have each system achromatically corrected compound elements would be used.

In Fig. 1 a high speed projection objective having a 38° total field angle on the long side thereof is disclosed in detail and in Fig. 4 a high speed camera objective having a 134° total field angle on the long conjugate side thereof is presented. In the optical system of Fig. 1 wherein a minimum distortion is desired, it should be noted, the image distortion at the edge of the field has been reduced to a factor of approximately 3% or less while in the optical system of Fig. 4, on the other hand, the image distortion at the edge of the field has purposely been carefully controlled so as to equal approximately 30%. The photographic objective of Fig. 4 might very well be employed for obtaining distorted film images of the type desired for use in the combined photographing and projection system disclosed in detail in the copending O'Brien application Serial No. 346,953, filed April 6, 1953. In the latter system wherein 30% has been indicated as desirable, moreover, the distortion control will be such as to still come within an acceptable tolerance, for example, approximately 3% of said selected value and while a very high correction for astigmatism is obtained. In the first mentioned system of Fig. 1, on the other hand wherein zero distortion is desirable, a value so closely approximating this desired value may be obtained as to have any error therein be visually undetectable from any normal audience position.

The optical values for the lens system of Fig. 1 are as follows:

[Equivalent focal length: F=100 mm.   f=/1.8.]

| Lens | $N_D$ | V | Radii, mm. | Thicknesses, mm. |
|---|---|---|---|---|
| 1 | 1.689 | 30.9 | $R_1=$ 406.00 | $t_1=$ 24.0 |
| 2 | 1.611 | 58.8 | $R_2=-190.13$ | $t_2=$ 9.00 |
|   |       |      | $R_3=$ 74.53 | $s_1=145.47$ |
|   |       |      | $R_4=-185.00$ | $t_3=$ 13.00 |
| 3 | 1.617 | 36.6 | $R_5=$ 251.10 |  |
| 4 | 1.611 | 58.8 | $R_6=-168.60$ | $t_4=$ 28.00 |
|   |       |      | $R_7=$ 255.73 | $s_2=$ .10 |
| 5 | 1.611 | 58.8 | $R_8=-333.47$ | $t_5=$ 22.00 |
|   |       |      | $R_9=$ 168.60 | $s_3=$ .10 |
| 6 | 1.611 | 58.8 | $R_{10}=-251.10$ | $t_6=$ 28.00 |
| 7 | 1.617 | 36.6 | $R_{11}=$ 185.00 | $t_7=$ 13.00 |
|   |       |      | $R_{12}=$ 200.40 | $s_4=$ 60.00 |
| 8 | 1.611 | 58.8 | $R_{13}=-333.47$ | $t_8=$ 21.33 |
| 9 | 1.5795 | 41.0 | $R_{14}=$ 104.93 | $t_9=$ 9.00 |
| 10 | 1.611 | 58.8 | $R_{15}=$ 582.80 | $t_{10}=$ 18.67 |
|   |       |      |  | $s_5=$ 16.80 |
| 11 | 1.523 | 58.5 | $R_{16}=$Aspheric | $t_{11}=$ 4.8 |
|   |       |      | $R_{17}=\infty$ |  |

In the above table the first column lists the lens elements numerically starting at the long conjugate side of the system, the second and third columns give the refractive index N (for the D line of the spectrum) and the dispersive index respectively for each element. The fourth column gives the radii of curvatures $R_1$ to $R_{17}$ of the lens surfaces and the fifth column gives the thicknesses $t_1$ to $t_{11}$ of the several elements as well as the axial spacing $s_1$ and $s_5$ therebetween. The + and − values of the radii indicate surfaces which are respectively convex and concave to the front. In the system for Fig. 1 the focal length $F_{A1}$ of the divergent part $A_1$ is approximately −173.2 mm., the focal length $F_{B1}$ of the convergent part $B_1$ is approximately 135.5 mm., and the working distance $d_{w1}$ is approximately equal to 89.5 mm. This means in other words that $F_{A1}$ is equal to 1.7 F, $F_{B1}$ is equal to 1.4 F and $d_{w1}$ is equal to .9 F. The stop point for the system is substantially at the center of the single biconvex element of the convergent part of the system. Nevertheless it may be desirable to stop down the system somewhat at times and this may be done with fairly satisfactory results by the use of a fix diaphragm $D_1$ located approximately 13.3 mm. forwardly of the first surface of the convergent part $B_1$. The aspheric curve $R_{16}$ in millimeters may be expressed $x=-3.0/10^7(y^4)-6.0/10^{12}(y^6)$. The system given above has been successfully made and used as a projection lens system having F equal to 75 mm.

In the camera objective of Fig. 4, the negative part $A_2$ is formed by a plurality of components, a negative meniscus element 1, a negative meniscus triplet (elements 2, 3, 4) and a negative meniscus doublet (elements 5, 6). Since the system of Fig. 4 is to cover approximately a full field of 134°, the front divergent part $A_2$ must be strongly negative. Accordingly, an achromatic doublet of the type shown at $A_1$ in Fig. 1 in order to function properly at such a location would have to be of far too large a diameter to be practical upon a professional motion picture camera. If it were merely made of a smaller diameter, not only would it fail to intercept and refract the extreme principal rays from the edge of the object field properly into the convergent part $B_2$ but also it would fail to collect much of the light from all parts of the object field directed toward the convergent component.

For these reasons it has been desirable to split up the power of the negative part $A_2$ into the negative element, triplet or doublet mentioned above while thus obtaining the same effective negative focal power. Correction of same for axial and lateral color may be had by the use of positive elements 3 and 5. Also these negative components are bent as much concave as conveniently possible about the part $B_2$ in order to avoid excessive distortion.

The optical values for the optical system of Fig. 4 is as follows:

[F=100 mm.   f/2.0.]

| Lens | $N_D$ | V | Radii, mm. | Thicknesses, mm. |
|---|---|---|---|---|
| 1 | 1.517 | 64.5 | $R_1=$ 1719.09 | $t_1=$ 57.73 |
|   |       |      | $R_2=$ 581.318 | $s_1=$ 86.59 |
| 2 | 1.611 | 58.8 | $R_3=$ 1154.55 | $t_2=$ 46.18 |
| 3 | 1.720 | 29.3 | $R_4=$ 437.682 | $t_3=127.00$ |
| 4 | 1.617 | 55.0 | $R_5=$ 8208.82 | $t_4=$ 34.64 |
|   |       |      | $R_6=$ 230.545 | $s_2=$ 92.36 |
|   |       |      | $R_7=$ 3565.23 | $t_5=$ 57.73 |
| 5 | 1.649 | 33.8 | $R_8=-$ 581.318 | $t_6=$ 27.86 |
| 6 | 1.617 | 55.0 | $R_9=$ 254.455 | $s_3=369.46$ |
|   |       |      | $R_{10}=$ 2028.55 | $t_7=$ 23.09 |
| 7 | 1.611 | 58.8 | $R_{11}=-$ 486.872 | $s_4=$ 0 |
|   |       |      | $R_{12}=$ 320.040 | $t_8=$ 46.18 |
| 8 | 1.611 | 58.8 | $R_{13}=-$ 416.906 | $s_5=$ 1.155 |
|   |       |      | $R_{14}=-$ 370.494 | $t_9=$ 23.09 |
| 9 | 1.689 | 30.9 | $R_{15}=$ 1149.119 | $s_6=138.55$ |
|   |       |      | $R_{16}=$ 581.314 | $t_{10}=$ 23.09 |
| 10 | 1.720 | 29.3 | $R_{17}=$ 189.264 | $t_{11}=$ 69.27 |
| 11 | 1.611 | 58.8 | $R_{18}=\infty$ | $s_7=$ 1.155 |
| 12 | 1.617 | 55.0 | $R_{19}=$ 381.346 | $t_{12}=$ 57.73 |
|   |       |      | $R_{20}=-1746.83$ | $s_8=$ 46.18 |
| 13 | 1.523 | 58.5 | $R_{21}=$Aspheric | $t_{13}=$ 11.55 |
| 14 | 1.523 | 58.5 | $R_{22}=\infty$ | $t_{14}=$ 11.55 |
|   |       |      | $R_{23}=$Aspheric |  |

In the above table similar designations for radii, thicknesses, spacings, etc. are employed for the lens elements numerically listed in the first column. The focal length $F_{A2}$ of the divergent part in the system of Fig. 4 is approximately −180.16 mm., the focal length $F_{B2}$ for the convergent part is approximately 283.58 mm., and the working distance $d_{w2}$ is approximately equal to 152.00 mm. The stop point of the system is located substantially at the vertex of the front surface of the first element of the convergent part of the system. The aspheric curve $R_{21}$ in millimeters may be expressed $$x=-1.50740/10^8(y^4)-7.311970/10^{14}(y^6)$$

and for $R_{23}$ expressed $$x=+1.50740/10^8(y^4)+7.311970/10^{14}(y^6)$$

The above system having an equivalent focal length equal to 22 mm. has been made and successfully used for photographic purposes; and when so used provided an image field having a diameter equal to approximately 56.86 mm. In this photographic objective it was found desirable to locate an iris diaphragm $D_2$ approximately 10 mm. forwardly of the first surface of the convergent part $B_2$.

In the construction of Fig. 4, it has been found advantageous to form the correction component $C_2$ as two separate aspheric plates 13 and 14 having their plano surfaces disposed in back-to-back relation and to have the total aspheric departure x for the component divided substantially equally between the outer surfaces of these two plates. One reason for this is that by so doing each aspheric curve can be formed with a shallower curve, for as is well known the difficulty of correctly forming aspheric surfaces increases with the extent of the deformation being provided. It is also desirable from an economic standpoint to form such aspheric elements by a known dropping technique, and therefor desirable to have each aspheric curve of as shallow curvature as conveniently possible to facilitate such fabrication. Of course other known fabricating techniques might be used if preferred without departing from the invention disclosed herein.

Thus from the values given previously it will be seen that the relatively short focal length of the divergent part in the system of Fig. 1 is approximately equal to 1.73 F while in Fig. 4 such as approximately equal to 1.80 F. It has been pointed out previously that the divergent front part or component in each case is given a relatively short focal length so as to provide a strongly negative focal power therefor. Thus in these two examples the focal power is equal to $$-\frac{1}{1.73\,F} \quad \text{and} \quad -\frac{1}{1.80\,F}$$

In fact the power may generally be kept between $$-\frac{1}{1.30\,F} \quad \text{and} \quad -\frac{1}{2.00\,F}$$

while still providing satisfactory reduction in curvature of field, the remainder of the system of course being compensated accordingly.

Also it will be appreciated that since the correction component for Fig. 1 is located a distance approximately equal to .89 F from the focal plane I and since the aperture stop is located a distance approximately equal to 2.72 F from the focal plane I, the correction component will be in fact disposed substantially 67.5 percent of the distance from the aperture stop to the image plane I of the system. With respect to the system of Fig. 4 wherein the correction component is located a distance approximately equal to 1.52 F from the focal plane I and the aperture stop is located a distance approximately equal to 6.04 F from this focal plane, the correction component will be disposed substantially 76.7 percent of the distance from the aperture stop to the image plane I of the system. In fact, the location of the correction component from the stop point, it has been found, may vary between 65 and 80 percent of the distance from the stop point to the focal plane I with satisfactory results, provided the aspheric curvatures are properly formed in accordance with the particular distance ratio selected.

In both systems as actually constructed and used, it will be appreciated, sufficient space was present to provide a clear working distance rearwardly of the correction component, this distance for the 75 mm. system being approximately equal to 67.10 mm. and for the 22 mm. system being approximately equal to 33.44 mm.

While in the systems disclosed the spacings between the divergent and convergent parts are, respectively, approximately 1.4 and 3.7 times the focal lengths of the systems, it is preferable that at no time such a spacing be greater than approximately 5.0 times the focal length of the system and no smaller than 0.5 times the focal length thereof. One reason why systems of the type being described herein are desired is that very uniform intensity of illumination throughout the image field may be obtained even at medium and relatively wide angles, before vignetting starts; which of course, thereafter takes place rapidly.

The use of an aspheric component (or a pair of aspherics together as in Fig. 4) in a wide angle system of the type being described herein has the advantage that the desired high degree of corrections for the system may be obtained with a shorter length system than would otherwise be possible, and this in turn enables the use of elements and components of smaller diameters.

It is pointed out that in the above described systems of Figs. 1 and 4, the aspheric components $C_1$ and $C_2$ are positioned between the aperture stop and the focal plane on the short conjugate side of the respective optical systems. This, therefore, places the aspheric corrective components comparatively near these focal planes of the systems and such has a very desirable advantage in that the said corrective components do not require as high optical refinements as they might otherwise require if they were placed at distances more removed from the said focal planes. Aspheric corrective components at best are extremely difficult and costly to fabricate, and the positioning of the components $C_1$ or $C_2$ at said above described locations nearer the focal planes on the short conjugate side decreases the necessity of obtaining as high optical precision in the fabrication of these components as would otherwise be required.

Since the systems of Figs. 1, 2 and of Figs. 4, 5 and the aspheric correction components therefor were particularly intended for use with color photography such as commonly used at the present time in the motion picture industry, the dispersive values of the glasses as well as the indices of refraction of the adjacent components were carefully selected in order that each divergent part and each convergent part of the system might be individually achromatized as much as possible. For example, in Fig. 1 negative element 2 of divergent part $A_1$ has a higher dispersive value but a lower refractive index than that of the positive element 1 adjacent thereto. Also in convergent part $B_1$ the negative elements 3 and 7 are of lower dispersive values and higher indices than the positive elements 4, 5 and 6 which they comprehend. Likewise, in Fig. 4 the divergent part $A_2$ includes between negative elements 2 and 4 a positive element 3 of relatively low dispersive value and relatively high index. Positive element 5 adjacent negative element 6 is likewise of lower V value but higher index than element 6. And in the convergent part $B_2$ of the system, negative elements 9 and 10 are each of lower dispersive values but higher indices than are the positive elements 8 and 11 adjacent these elements.

While the previously disclosed objectives have been described as systems carefully computed and color corrected for use in a motion picture projector and a motion picture camera, it is to be understood that these systems can be advantageously put to other uses, for example, aerial photography. It might even be that such systems would be at times suitable, when proper filters are used therewith, for photographic uses at particular selected wave lengths and in such instances no extended consideration of color correction values other than that at the wave length selected need be given to the design of the systems.

While the invention has been described with respect to certain particular preferred examples which give very satisfactory results, it will be understood by those skilled in the art after an understanding of the invention, that various changes and modifications may be made without departing from the spirit and scope of the invention and it is intended therefore in the appended claims to cover all such changes and modifications.

Having described my invention, I claim:

1. An optical system for photographing and reproducing purposes, said system comprising a convergent refractive part, a divergent refractive part axially aligned therewith on the long conjugate side of said system and so optically spaced therefrom as to provide a relatively long free working distance between said system and a predetermined focal plane of said system on the short conjugate side thereof, said divergent part having a relatively short focal length relative to the total focal length of said system so as to materially reduce the curvature of field of said system, and an aspherically curved corrective refractive part positioned between said convergent part and said predetermined focal plane, and axially aligned with said divergent and convergent parts, said corrective part being so disposed at a predetermined axial distance from said convergent part and so aspherically curved in accordance with said axial distance that marginal rays transmitted by said convergent part and tending to contribute astigmatism of the system will be modified primarily by the more nearly centrally located aspherically curved portions of said corrective part, and other rays transmitted by said corrective part and tending to contribute distortion to outer portions of the image being formed by said system will be modified primarily by differently aspherically curved portions of said corrective part outwardly of said more centrally located portions, whereby said corrective part will function to substantially eliminate the astigmatism of said system while reducing by a predetermined amount the distortion thereof.

2. An optical system for photographing and reproducing purposes, said system comprising a convergent refractive part, a divergent refractive part axially aligned therewith on the long conjugate side of said system and so optically spaced therefrom as to provide a relatively long free working distance between said system and a predetermined focal plane of said system on the short conjugate side thereof, said divergent part having a relatively short focal length relative to the total focal length of said system so as to materially reduce the curvature of field of said system, said divergent part also being bent about said convergent part so as to provide on the long conjugate side thereof a surface of convex curvature, and an aspherically curved corrective refractive part positioned between said convergent part and said predetermined focal plane, and axially aligned with said divergent and convergent parts, said corrective part being so disposed at a predetermined axial distance from said convergent part so aspherically curved in accordance with said axial distance that marginal rays transmitted by said convergent part and tending to contribute astigmatism of the system will be modified primarily by the more nearly centrally located aspherically curved portions of said corrective part, and other rays transmitted by said corrective part and tending to contribute distortion to outer portions of the image being formed by said system will be modified primarily by differently aspherically curved portions of said corrective part outwardly of said more centrally located portions, whereby said corrective part will function to substantially eliminate the astigmatism of said system while reducing by a predetermined amount the image distortion thereof.

3. An optical system for photographing and reproducing purposes, said system comprising a convergent refractive part, a divergent refractive part axially aligned therewith on the long conjugate side of said system and so optically spaced therefrom as to provide a relatively long free working distance between said system and a predetermined focal plane of said system on the short conjugate side thereof, said divergent part having a relatively short focal length relative to the total focal length of said system so as to materially reduce the curvature of field of said system, and an aspherically curved corrective refractive part positioned between said convergent part and said predetermined focal plane, and axially aligned with said divergent and convergent parts, the aperture stop of said system being located adjacent said convergent part, and said corrective part being so disposed at a predetermined axial distance from said convergent part and said aperture stop located therebetween and so aspherically curved in accordance with said axial distance that marginal rays transmitted by said convergent part and tending to contribute astigmatism of the system will be modified primarily by the more nearly centrally located aspherically curved portions of said corrective part, and other rays transmitted by said corrective part and tending to contribute distortion to outer portions of the image being formed by said system will be modified primarily by differently aspherically curved portions of said corrective part outwardly of said more centrally located portions, whereby said corrective part will function to substantially eliminate the astigmatism of said system while reducing by a predetermined amount the image distortion thereof.

4. An optical system for photographing and reproducing purposes, said system comprising a convergent refractive part, a divergent refractive part axially aligned therewith on the long conjugate side of said system and so optically spaced therefrom as to provide a relatively long free working distance between said system and a predetermined focal plane of said system on the short conjugate side thereof, said divergent part having a relatively short focal length ranging between approximately 1.3 F and 2.0 F so as to materially reduce the curvature of field of said system, said convergent part having a focal length ranging between approximately 1.3 F and 2.8 F and being spaced between from said divergent part a distance ranging between approximately 0.5 F and 5.0 F, and an aspherically curved corrective refractive part positioned between said convergent part and said predetermined focal plane and axially aligned with said divergent and convergent parts, said corrective part being so disposed at a predetermined axial location optically spaced from said convergent part and from said predetermined focal plane and so aspherically curved as to substantially eliminate the astigmatism of said system while reducing by a predetermined amount the image distortion thereof, and wherein F is the equivalent focal length of the system.

5. An optical system for photographing and reproducing purposes, said system comprising a convergent refractive part, a divergent refractive part axially aligned therewith on the long conjugate side of said system and so optically spaced therefrom as to provide a relatively long free working distance between said system and a predetermined focal plane of said system on the short conjugate side thereof, said divergent part having a relatively short focal length relative to the total focal length of said system so as to materially reduce the curvature of field of said system, and an aspherically curved corrective refractive part positioned between said convergent part and said predetermined focal plane, and axially aligned with said divergent and convergent parts, the aperture stop of said system being located adjacent said convergent part, and said corrective part being so disposed at a predetermined axial distance from said convergent part and said aperture stop located therebetween and so aspherically curved in accordance with said axial distance that marginal rays transmitted by said convergent part and tending to contribute astigmatism of the system will be modified primarily by the more nearly centrally located aspherically curved portions of said corrective part, and other rays transmitted by said corrective part and tending to contribute distortion to outer portions of the image being formed by said system will be modified primarily by differently aspherically curved portions of said corrective part outwardly of said more centrally located portions, whereby said corrective part will function to substantially eliminate the astigmatism of said system while reducing by a predetermined amount the image distortion thereof, said predetermined axial location of said corrective part being between approximately 65 and 80 percent of the distance from said aperture stop to said focal plane.

6. An optical system for photographing and reproducing purposes, said system comprising a convergent refractive part, a divergent refractive part axially aligned therewith on the long conjugate side of said system and so optically spaced therefrom as to provide a relatively long free working distance between said system and a predetermined focal plane of said system on the short conjugate side thereof, said divergent part having a relatively short focal length relative to the total focal length of said system so as to materially reduce the curvature of field of said system, and an aspherically curved corrective refractive part positioned between said convergent part and said predetermined focal plane, and axially aligned with said divergent and convergent parts, the aperture stop of said system being located adjacent said convergent part, and said corrective part being so disposed at a predetermined axial distance from said convergent part and said aperture stop located therebetween and so aspherically curved in accordance with said axial distance that marginal rays transmitted by said convergent part and tending to contribute astigmatism of the system will be modified primarily by the more nearly centrally located aspherically curved portions of said corrective part, and other rays transmitted by said corrective part and tending to contribute distortion to outer portions of the image being formed by said system will be modified primarily by differently aspherically curved portions of said corrective part outwardly of said more centrally located portions, whereby said corrective part will function to substantially eliminate the astigmatism of said system while reducing by a predetermined amount the image distortion thereof, said predetermined axial location of said corrective part being between approximately 65 and 80 percent of the distance from said aperture stop to said focal plane, and said free working distance being between approximately .8 F and 2. F, wherein F is the equivalent focal length of said system.

7. An optical system for photographing and reproducing purposes, said system comprising a convergent refractive part, a divergent refractive part axially aligned therewith on the long conjugate side of said system and so optically spaced therefrom as to provide a relatively long free working distance between said system and a predetermined focal plane of said system on the short conjugate side thereof, said divergent part having a relatively short focal length relative to the total focal length of said system so as to materially reduce the curvature of field of said system, said divergent part also being bent about said convergent part so as to provide on the long conjugate side thereof a surface of convex curvature, and an aspherically curved corrective refractive part positioned between said convergent part and said predetermined focal plane, and axially aligned with said divergent and convergent parts, the aperture stop of said system being located adjacent said convergent part, and said corrective part being so disposed at a predetermined axial distance from said convergent part and said aperture stop located therebetween and so aspherically curved in accordance with said axial distance that marginal rays transmitted by said convergent part and tending to contribute astigmatism of the system will be modified primarily by the more nearly centrally located aspherically curved portions of said corrective part, and other rays transmitted by said corrective part and tending to contribute distortion to outer portions of the image being formed by said system will be modified primarily by differently aspherically curved portions of said corrective part outwardly of said more centrally located portions, whereby said corrective part will function to substantially eliminate the astigmatism of said system while reducing by a predetermined amount the image distortion thereof.

8. An optical system for photographing and reproducing purposes, said system comprising a convergent refractive part, a divergent refractive part axially aligned therewith on the long conjugate side of said system and so optically spaced therefrom as to provide a relatively long free working distance between said system and a predetermined focal plane of said system on the short conjugate side thereof, said divergent part having a relatively short focal length ranging between approximately 1.3 F and 2.0 F so as to materially reduce the curvature of field of said system said divergent part also being bent about said convergent part so as to provide on the long conjugate side thereof a surface of convex curvature, said convergent part having a focal length ranging between approximately 1.3 F and 2.8 F and being spaced between from said divergent part a distance ranging between approximately 0.5 F and 5.0 F, and an aspherically curved corrective refractive part positioned between said convergent part and said predetermined focal plane and axially aligned with said divergent and convergent parts, said corrective part being so disposed at a predetermined axial location optically spaced from said convergent part and from said predetermined focal plane and so aspherically curved as to substantially eliminate the astigmatism of said system while reducing by a predetermined amount the image distortion thereof, and wherein F is the equivalent focal length of the system.

9. An optical system for photographing and reproducing purposes, said system comprising a convergent refractive part, a divergent refractive part axially aligned therewith on the long conjugate side of said system and so optically spaced therefrom as to provide a relatively long free working distance between said system and a predetermined focal plane of said system on the short conjugate side thereof, said divergent part having a relatively short focal length relative to the total focal length of said system so as to materially reduce the curvature of field of said system, said divergent part also being bent about said convergent part so as to provide on the long conjugate side thereof a surface of convex curvature, and an aspherically curved corrective refractive part positioned between said convergent part and said predetermined focal plane, and axially aligned with said divergent and convergent parts, the aperture stop of said system being located adjacent said convergent part, and said corrective part being so disposed at a predetermined axial distance from said convergent part and said aperture stop located therebetween and so aspherically curved in accordance with said axial distance that marginal rays transmitted by said convergent part and tending to contribute astigmatism of the system will be modified primarily by the more nearly centrally located aspherically curved portions of said corrective part, and other rays transmitted by said corrective part and tending to contribute distortion to outer portions of the image being formed by said system will be modified primarily by differently aspherically curved portions of said corrective part outwardly of said more centrally located portions, whereby said corrective part will function to substantially eliminate the astigmatism of said system while reducing by a predetermined amount the image distortion thereof, said predetermined axial location of said corrective part being between approximately 65 and 80 percent of the distance from said aperture stop to said focal plane.

10. An optical system for photographing and reproducing purposes, said system comprising a convergent refractive part, a divergent refractive part axially aligned therewith on the long conjugate side of said system and so optically spaced therefrom as to provide a relatively long free working distance between said system and a predetermined focal plane of said system on the short conjugate side thereof, said divergent part having a relatively short focal length relative to the total focal length of said system so as to materially reduce the curvature of field of said system, said divergent part also being bent about said convergent part so as to provide on the long conjugate side thereof a surface of convex curvature, and an aspherically curved corrective refractive part positioned between said convergent part and said predetermined focal plane, and axially aligned with said divergent and convergent parts, the aperture stop of said system being located adjacent said convergent part, and said corrective part being so disposed at a predetermined axial distance from said convergent part and said aperture stop located therebetween and said predetermined focal plane and so aspherically curved in accordance with said axial distance that marginal rays transmitted by said convergent part and tending to contribute astigmatism of the system will be modified primarily by the more nearly centrally located aspherically curved portions of said corrective part, and other rays transmitted by said corrective part and tending to contribute distortion to outer portions of the image being formed by said system will be modified primarily by differently aspherically curved portions of said corrective part outwardly of said more centrally located portions, whereby said corrective part will function to substantially eliminate the astigmatism of said system while reducing by a predetermined amount the image distortion thereof, said predetermined axial location of said corrective part being between approximately 65 and 80 percent of the distance from said aperture stop to said focal plane, and said free working distance being between approximately .8 F and 2 F, wherein F is the equivalent focal length of said system.

11. An optical system for photographic and projection purposes, said system comprising a convergent refractive part, a divergent refractive part axially aligned therewith on the long conjugate side of said system, said parts being optically spaced apart by a distance ranging between approximately 0.5 F and 5.0 F and having powers which are such as to provide a relatively long distance between said convergent part and a predetermined focal plane on the short conjugate side of said system for receiving a corrective refractive part and which is between approximately 1.2 F and 2.3 F, said divergent part having a relatively short focal length ranging between approximately 1.3 F and 2.0 F so as to materially reduce the curvature of field of said system, and wherein F is the equivalent focal length of said system as a whole, and an aspherically curved corrective refractive part positioned between said convergent part and said predetermined focal plane and axially aligned with said divergent and convergent parts, said corrective part being so disposed at a predetermined axial location optically spaced from said predetermined focal plane as to provide a free working distance ranging between approximately .8 F and 1.6 F and so aspherically curved as to substantially eliminate the astigmatism of said system while reducing by a predetermined controlled amount the image distortion thereof.

12. An optical system for photographic and projection purposes having substantially the following specifications:

[Equivalent focal length: F=100 mm.    f=/1.8.]

| Lens | $N_D$ | V | Radii, mm. | Thicknesses, mm. |
|---|---|---|---|---|
| 1 | 1.689 | 30.9 | $R_1=$ 406.00 | $t_1=$ 24.0 |
| 2 | 1.611 | 58.8 | $R_2=-190.13$ | $t_2=$ 9.00 |
|   |       |      | $R_3=$ 74.53 | $s_1=145.47$ |
| 3 | 1.617 | 36.6 | $R_4=-185.00$ | $t_3=$ 13.00 |
| 4 | 1.611 | 58.8 | $R_5=$ 251.10 | $t_4=$ 28.00 |
|   |       |      | $R_6=-168.60$ | $s_2=$ .10 |
|   |       |      | $R_7=$ 255.73 | $t_5=$ 22.00 |
| 5 | 1.611 | 58.8 | $R_8=-333.47$ | $s_3=$ .10 |
|   |       |      | $R_9=$ 168.60 | $t_6=$ 23.00 |
| 6 | 1.611 | 58.8 | $R_{10}=-251.10$ | $t_7=$ 13.00 |
| 7 | 1.617 | 36.6 | $R_{11}=$ 185.00 | $s_4=$ 60.00 |
|   |       |      | $R_{12}=$ 200.40 | $t_8=$ 21.33 |
| 8 | 1.611 | 58.8 | $R_{13}=-333.47$ |  |
| 9 | 1.5795 | 41.0 | $R_{14}=$ 104.93 | $t_9=$ 9.00 |
| 10 | 1.611 | 58.8 | $R_{15}=$ 582.80 | $t_{10}=$ 18.67 |
|   |       |      | $R_{16}=$ Aspheric | $s_5=$ 16.80 |
| 11 | 1.523 | 58.5 | $R_{17}=\infty$ | $t_{11}=$ 4.8 | wherein the first column lists the lens elements numerically starting at the long conjugate side of the system, the second and third columns give the refractive index N (for the D line of the spectrum) and the dispersive index respectively for each element, the fourth column gives the radii of curvatures $R_1$ to $R_{17}$ of the lens surfaces and the fifth column gives the thicknesses $t_1$ to $t_{11}$ of the several elements as well as the axial spacing $s_1$ and $s_5$ therebetween, the + and − values of the radii indicate surfaces which are respectively convex and concave to the front, and wherein the aspheric curve $R_{16}$ in millimeters may be expressed $x=-3.0/10^7(y^4)-6.0/10^{12}(y^6)$.

13. An optical system for photographic and projection purposes having substantially the following specifications:

[F=100 mm.    f/2.0.]

| Lens | $N_D$ | V | Radii, mm. | Thicknesses, mm. |
|---|---|---|---|---|
| 1 | 1.517 | 64.5 | $R_1=$ 1719.09 | $t_1=$ 57.73 |
|   |       |      | $R_2=$ 581.318 | $s_1=$ 86.59 |
| 2 | 1.611 | 58.8 | $R_3=$ 1154.55 | $t_2=$ 46.18 |
| 3 | 1.720 | 29.3 | $R_4=$ 437.682 | $t_3=$ 127.00 |
|   |       |      | $R_5=$ 8208.82 |  |
| 4 | 1.617 | 55.0 | $R_6=$ 230.545 | $t_4=$ 34.64 |
|   |       |      | $R_7=$ 3565.23 | $s_2=$ 92.36 |
| 5 | 1.649 | 33.8 | $R_8=-$ 581.318 | $t_5=$ 57.73 |
| 6 | 1.617 | 55.0 | $R_9=$ 254.455 | $t_6=$ 27.86 |
|   |       |      | $R_{10}=$ 2028.55 | $s_3=$ 369.46 |
| 7 | 1.611 | 58.8 | $R_{11}=-$ 486.872 | $t_7=$ 23.09 |
|   |       |      | $R_{12}=$ 320.040 | $s_4=$ 0 |
| 8 | 1.611 | 58.8 | $R_{13}=-$ 416.906 | $t_8=$ 46.18 |
|   |       |      | $R_{14}=-$ 370.494 | $s_5=$ 1.155 |
| 9 | 1.689 | 30.9 | $R_{15}=$ 1149.119 | $t_9=$ 23.09 |
|   |       |      | $R_{16}=$ 581.314 | $s_6=$ 138.55 |
| 10 | 1.720 | 29.3 | $R_{17}=$ 189.264 | $t_{10}=$ 23.09 |
| 11 | 1.611 | 58.8 | $R_{18}=\infty$ | $t_{11}=$ 69.27 |
|   |       |      | $R_{19}=$ 381.346 | $s_7=$ 1.155 |
| 12 | 1.617 | 55.0 | $R_{20}=-1746.83$ | $t_{12}=$ 57.73 |
|   |       |      | $R_{21}=$ Aspheric | $s_8=$ 46.18 |
| 13 | 1.523 | 58.5 | $R_{22}=\infty$ | $t_{13}=$ 11.55 |
| 14 | 1.523 | 58.5 | $R_{23}=$ Aspheric | $t_{14}=$ 11.55 | wherein the first column lists the lens elements numerically starting at the long conjugate side of the system, the second and third columns give the refractive index N (for the D line of the spectrum) and the dispersive index respectively for each element, the fourth column gives the radii of curvature $R_1$ to $R_{23}$ of the lens surfaces and the fifth column gives the thickness $t_1$ to $t_{14}$ of the several elements as well as the axial spacing $s_1$ and $s_8$ therebetween, the + and − values of the radii indicate surfaces which are respectively convex and concave to the front, and wherein the aspheric curve $R_{21}$ in millimeters may be expressed $$x=-1.50740/10^8(y^4)-7.311970/10^{14}(y^6)$$

and $R_{23}$ may be expressed $$x=+1.50740/10^8(y^4)+7.311970/10^{14}(y^6)$$

14. An optical system for photographic and projection purposes having substantially the following specifications:

[Equivalent focal length: F=100 mm.   f=/1.8.]

| Lens | $N_D$ | V | Radii, mm. | Thicknesses, mm. |
|---|---|---|---|---|
| 1 | 1.689 | 30.9 | $R_1$ = 406.00 | $t_1$ = 24.0 |
|   |       |      | $R_2$ = −190.13 |  |
| 2 | 1.611 | 58.8 | $R_3$ = 74.53 | $t_2$ = 9.00 |
|   |       |      |                | $s_1$ = 145.47 |
|   |       |      | $R_4$ = −185.00 |  |
| 3 | 1.617 | 36.6 | $R_5$ = 251.10 | $t_3$ = 13.00 |
| 4 | 1.611 | 58.8 |                | $t_4$ = 28.00 |
|   |       |      | $R_6$ = −168.60 | $s_2$ = .10 |
|   |       |      | $R_7$ = 255.73 |  |
| 5 | 1.611 | 58.8 |                | $t_5$ = 22.00 |
|   |       |      | $R_8$ = −333.47 | $s_3$ = .10 |
|   |       |      | $R_9$ = 168.60 |  |
| 6 | 1.611 | 58.8 |                | $t_6$ = 28.00 |
|   |       |      | $R_{10}$ = −251.10 |  |
| 7 | 1.617 | 36.6 |                | $t_7$ = 13.00 |
|   |       |      | $R_{11}$ = 185.00 | $s_4$ = 60.00 |
|   |       |      | $R_{12}$ = 200.40 |  |
| 8 | 1.611 | 58.8 |                | $t_8$ = 21.33 |
|   |       |      | $R_{13}$ = −333.47 |  |
| 9 | 1.5795 | 41.0 |               | $t_9$ = 9.00 |
|   |       |      | $R_{14}$ = 104.93 |  |
| 10 | 1.611 | 58.8 |               | $t_{10}$ = 18.67 |
|   |       |      | $R_{15}$ = 582.80 | $s_5$ = 16.80 |
|   |       |      | $R_{16}$ = Aspheric |  |
| 11 | 1.523 | 58.5 |               | $t_{11}$ = 4.8 |
|   |       |      | $R_{17}$ = ∞   |  | wherein the first column lists the lens elements numerically starting at the long conjugate side of the system, the second and third columns give the refractive index N (for the D line of the spectrum) and the dispersive index respectively for each element, the fourth column gives the radii of curvatures $R_1$ to $R_{17}$ of the lens surfaces and the fifth column gives the thicknesses $t_1$ to $t_{11}$ of the several elements as well as the axial spacing $s_1$ and $s_5$ therebetween, the + and − values of the radii indicate surfaces which are respectively convex and concave to the front, and wherein the lens element embodying the aspherically curved surface $R_{16}$ is so curved and located in said system as to provide a predetermined exact control of the amount of distortion contained in the image provided by the system, said system at the same time being well corrected for spherical aberration, chromatic aberration, coma and curvature of field.

15. An optical system for photographic and projection purposes having substantially the following specifications:

[F=100 mm.   f/2.0.]

| Lens | $N_D$ | V | Radii, mm. | Thicknesses, mm. |
|---|---|---|---|---|
| 1 | 1.517 | 64.5 | $R_1$ = 1719.09 | $t_1$ = 57.73 |
|   |       |      | $R_2$ = 581.318 | $s_1$ = 86.59 |
|   |       |      | $R_3$ = 1154.55 |  |
| 2 | 1.611 | 58.8 |               | $t_2$ = 46.18 |
|   |       |      | $R_4$ = 437.682 |  |
| 3 | 1.720 | 29.3 |               | $t_3$ = 127.00 |
|   |       |      | $R_5$ = 8208.82 |  |
| 4 | 1.617 | 55.0 |               | $t_4$ = 34.64 |
|   |       |      | $R_6$ = 230.545 | $s_2$ = 92.36 |
|   |       |      | $R_7$ = 3565.23 |  |
| 5 | 1.649 | 33.8 |               | $t_5$ = 57.73 |
|   |       |      | $R_8$ = −581.318 |  |
| 6 | 1.617 | 55.0 |               | $t_6$ = 27.86 |
|   |       |      | $R_9$ = 254.455 | $s_3$ = 369.46 |
|   |       |      | $R_{10}$ = 2028.55 |  |
| 7 | 1.611 | 58.8 |               | $t_7$ = 23.09 |
|   |       |      | $R_{11}$ = −486.872 | $s_4$ = 0 |
|   |       |      | $R_{12}$ = 320.040 |  |
| 8 | 1.611 | 58.8 |               | $t_8$ = 46.18 |
|   |       |      | $R_{13}$ = −416.906 | $s_5$ = 1.155 |
|   |       |      | $R_{14}$ = −370.494 |  |
| 9 | 1.689 | 30.9 |               | $t_9$ = 23.09 |
|   |       |      | $R_{15}$ = 1149.119 | $s_6$ = 138.55 |
|   |       |      | $R_{16}$ = 581.314 |  |

[F=100 mm.   f/2.0.]

| Lens | $N_D$ | V | Radii, mm. | Thicknesses, mm. |
|---|---|---|---|---|
| 10 | 1.720 | 29.3 | $R_{17}$ = 189.264 | $t_{10}$ = 23.09 |
| 11 | 1.611 | 58.8 |                    | $t_{11}$ = 69.27 |
|    |       |      | $R_{18}$ = ∞       | $s_7$ = 1.155 |
|    |       |      | $R_{19}$ = 381.346 |  |
| 12 | 1.617 | 55.0 |                    | $t_{12}$ = 57.73 |
|    |       |      | $R_{20}$ = −1746.83 | $s_8$ = 46.18 |
|    |       |      | $R_{21}$ = Aspheric |  |
| 13 | 1.523 | 58.5 |                    | $t_{13}$ = 11.55 |
|    |       |      | $R_{22}$ = ∞       |  |
| 14 | 1.523 | 58.5 | $R_{23}$ = Aspheric | $t_{14}$ = 11.55 | wherein the first column lists the lens elements numerically starting at the long conjugate side of the system, the second and third columns give the refractive index N (for the D line of the spectrum) and the dispersive index respectively for each element, the fourth column gives the radii of curvature $R_1$ to $R_{23}$ of the lens surfaces and the fifth column gives the thickness $t_1$ to $t_{14}$ of the several elements as well as the axial spacing $s_1$ and $s_8$ therebetween, the + and − values of the radii indicate surfaces which are respectively convex and concave to the front, and wherein the lens elements embodying the aspherically curved surfaces $R_{21}$ and $R_{23}$ are so curved and located in said system as to provide a predetermined exact control of the amount of distortion contained in the image provided by the system, said system at the same time being well corrected for spherical aberration, chromatic aberration, coma and curvature of field.

16. An optical system for photographing and reproducing purposes, said system comprising a convergent refractive part, a divergent refractive part axially aligned therewith on the long conjugate side of said system and so optically spaced therefrom as to provide a relatively long free working distance between said system and a predetermined focal plane of said system on the short conjugate side thereof, said divergent part having a relatively short focal length with respect to the total focal length of said system so as to materially reduce the curvature of field of said system, said system having an aperture stop located substantially at a predetermined axial position adjacent said convergent part, and an aspherically curved corrective refractive part positioned between approximately 65 and 80 percent of the distance from said aperture stop to said predetermined focal plane and axially aligned with said divergent and convergent parts, said corrective part being so aspherically curved in accordance with its axial location as to satisfy the equation $x = cy^4 + ey^6$ wherein $x$ and $y$ are values of axial and lateral displacements of various points upon said curve relative to the vertex thereof, $c$ and $e$ are constants for the system, and wherein the lateral displacement of the principal ray from the edge of the object field relative to the lateral displacement of the marginal paraxial ray at said corrective part is such as to substantially eliminate the astigmatism of said system while reducing by a predetermined amount the image distortion thereof.

17. An optical system of the character described comprising a convergent refractive part having optical characteristics contributing negative curvature of field and negative distortion in said system, a divergent refractive part in optical alignment therewith, said divergent refractive part having a relatively short focal length in comparison with the total focal length of said system for reducing susbtantially to a predetermined value the curvature of field of said system, and being disposed at a preselected axial distance from said convergent part on the long conjugate side of said system, said divergent refractive part having optical characteristics contributing negative distortion in said system, and an aspherically curved corrective refractive part of predetermined aspheric shape positioned between said convergent part and a focal plane of said system on the short conjugate side thereof, and spaced a predetermined appreciable axial distance from said convergent refractive part as well as an appreciable distance from said focal plane, said aspherically curved refractive part being so differently aspherically curved in different parts thereof, considered from the center to the peripheral edge thereof, as to contribute appreciable amounts of positive distortion and appreciable amounts of positive astigmatism to the image being formed by said system, whereby said aspherically curved refractive part will serve in said system to substantially eliminate the astigmatism thereof while simultaneously functioning to reduce by a preselected amount the distortion in the image being formed by said system.

18. An optical system of the character described comprising a convergent refractive part having optical characteristics contributing negative curvature of field and negative distortion in said system, a divergent refractive part in optical alignment therewith, said divergent part having a relatively short focal length in comparison with the total local length of said system for reducing substantially to a predetermined value the curvature of field of said system, and being disposed at a preselected axial distance from said convergent part on the long conjugate side of said system, said divergent part having optical characteristics contributing negative distortion in said system, and an aspherically curved corrective refractive part positioned between said convergent part and a focal plane of said system on the short conjugate side thereof and spaced a predetermined axial distance from said convergent part, said aspherically curved refractive part being so differently aspherically curved in different parts thereof, considered from the center to the peripheral edge thereof, as to contribute positive distortion and positive astigmatism to the image being formed by said system, said relatively short focal length of said divergent part being between approximately 1.3 F and 2.0 F, the focal length of the convergent part being between approximately 1.3 F and 2.8 F, and the distance between these parts being between approximately 0.5 F and 5.0 F, and wherein F is the equivalent focal length of said system, whereby said aspherically curved refractive part will serve in said system to substantially eliminate the astigmatism thereof while simultaneously functioning to reduce by a preselected amount the distortion in the image being formed by said system.

References Cited in the file of this patent

UNITED STATES PATENTS

| | | |
|---|---|---|
| 1,578,259 | Boegehold | Mar. 30, 1926 |
| 1,996,054 | Bowen | Apr. 2, 1935 |
| 2,317,790 | Mellor | Apr. 27, 1943 |
| 2,341,385 | Kingslake et al. | Feb. 8, 1944 |
| 2,377,268 | Rinia | May 29, 1945 |
| 2,430,150 | Warmisham | Nov. 14, 1947 |
| 2,479,907 | Cox | Aug. 23, 1949 |
| 2,548,569 | Tolle | Apr. 10, 1951 |
| 2,550,685 | Garusto | May 1, 1951 |
| 2,559,844 | Bennett | July 10, 1951 |
| 2,576,436 | Baker | Nov. 27, 1951 |
| 2,594,020 | Hopkins et al. | Apr. 22, 1952 |
| 2,594,021 | Hopkins et al. | Apr. 22, 1952 |
| 2,596,799 | Tillyer et al. | May 13, 1952 |
| 2,629,285 | Baker | Feb. 24, 1953 |